(12) United States Patent
Kotzin (10) Patent No.: US 9,864,978 B2
(45) Date of Patent: Jan. 9, 2018

(54) METHOD AND APPARATUS FOR ENABLING CONTENT TO BE SHARED AMONG MULTIPLE DEVICES IN A SECURE ENVIRONMENT

(75) Inventor: Michael D. Kotzin, Buffalo Grove, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1472 days.

(21) Appl. No.: 12/263,922

(22) Filed: Nov. 3, 2008

(65) Prior Publication Data

US 2009/0055922 A1 Feb. 26, 2009

Related U.S. Application Data

(62) Division of application No. 11/557,591, filed on Nov. 8, 2006, now abandoned.

(51) Int. Cl.
*G06F 21/00* (2013.01)
*G06Q 20/12* (2012.01)
*G06F 21/62* (2013.01)
*H04L 29/06* (2006.01)
*H04W 12/08* (2009.01)
*H04W 12/04* (2009.01)

(52) U.S. Cl.
CPC ..... *G06Q 20/1235* (2013.01); *G06F 21/6218* (2013.01); *H04L 63/0853* (2013.01); *H04W 12/08* (2013.01); *G06F 2221/2141* (2013.01); *H04L 2463/101* (2013.01); *H04W 12/04* (2013.01)

(58) Field of Classification Search
USPC .......................................................... 705/56
See application file for complete search history.

(56) References Cited

U.S. PATENT DOCUMENTS 5,892,900 A * 4/1999 Ginter ..................... G06F 21/10
726/26
6,928,299 B1 * 8/2005 Rinne et al. .................. 455/555
7,623,852 B2 * 11/2009 Gnuschke ........... H04M 7/0069
455/410

(Continued)

OTHER PUBLICATIONS

PCT Search and Written Opinion, from the International Searching Authority, dated May 15, 2008.

(Continued)

*Primary Examiner* — Zeshan Qayyum
(74) *Attorney, Agent, or Firm* — Young Basile Hanlon & MacFarlane, P.C.

(57) ABSTRACT

A Master device (e.g., a SIM card) is configured with information regarding one or more Slave devices (e.g., SIM cards) that are associated with the Master device. The Master device is installed in a user device that receives content files and access and usage rights from a content provider. The Master device identifies one or more Slave devices that are associated with the Master device and transmits content files and the rights data to the Slave devices. A user device in which a Slave device is installed receives the content files and rights data sent by the Master device. The Slave device extracts a key from the rights data and provides the key to a decryption component of the user device, which uses the key to decrypt the content file.

8 Claims, 7 Drawing Sheets

(56) References Cited

U.S. PATENT DOCUMENTS

| | | | |
|---|---|---|---|
| 2004/0049460 A1* | 3/2004 | Doron | G06Q 20/105 |
| | | | 705/41 |
| 2005/0096087 A1* | 5/2005 | Kim | 455/558 |
| 2005/0210287 A1 | 9/2005 | Paatero | |
| 2005/0216739 A1 | 9/2005 | Lee et al. | |
| 2005/0216763 A1* | 9/2005 | Lee | G06F 21/10 |
| | | | 726/22 |
| 2005/0250537 A1* | 11/2005 | Narea | 455/558 |
| 2006/0080259 A1* | 4/2006 | Wajs | 705/51 |
| 2006/0107330 A1 | 5/2006 | Ben-Yaacov et al. | |
| 2006/0155650 A1* | 7/2006 | Oh et al. | 705/57 |
| 2006/0166717 A1 | 7/2006 | Seshadri et al. | |
| 2008/0016352 A1* | 1/2008 | Perlman | 713/171 |

OTHER PUBLICATIONS

Office Action for U.S. Appl. No. 11/557,591, dated Dec. 15, 2008, 18 pages.

Office Action for U.S. Appl. No. 11/557,591, dated Jul. 10, 2009, 12 pages.

\* cited by examiner

METHOD AND APPARATUS FOR ENABLING CONTENT TO BE SHARED AMONG MULTIPLE DEVICES IN A SECURE ENVIRONMENT

CROSS-REFERENCE TO RELATED APPLICATIONS

This application is a divisional of U.S. patent application Ser. No. 11/557,591, filed Nov. 8, 2006, and entitled, "METHOD AND APPARATUS FOR ENABLING CONTENT TO BE SHARED AMONG MULTIPLE DEVICES IN A SECURE ENVIRONMENT," the entirety of which is incorporated herein by reference.

TECHNICAL FIELD OF THE INVENTION

The invention relates to a method and an apparatus for enabling content to be shared among multiple devices in a secure environment in which access and usage rights are controlled.

BACKGROUND OF THE INVENTION

The term "content" is used in the broadcast and communications industries to denote digital files, such as, for example, video files (e.g., movies), audio files (e.g., music), image files, and text files. Content is distributed by a content provider to end users over wired and wireless networks to devices that have content renderers that render the content, e.g., display the content on a display device and/or playback the content on an audio playback device. For example, a cable television provider or multiple service operator (MSO) may allow a paying customer to download a movie that the user then watches on a laptop computer, a television set, a mobile telephone, etc.

Content providers manage the distribution of content (e.g., downloading, streaming, etc.) by using one or more of a variety of digital rights management (DRM) techniques. DRM techniques are used to prevent unauthorized users from gaining access to content while allowing authorized users to access the content. This is typically accomplished by encrypting the content when it is distributed to the authorized user, and providing the user with a key that allows the user's device to decrypt the content so that it can be rendered. DRM, however, encompasses more than securing content from unauthorized access. It also encompasses describing, identifying, trading, monitoring, and tracking of all forms of rights usages over both tangible and intangible assets. The term "tangible assets" refers to physical content, whereas the term "intangible assets" generally refers to copyrights in the content held by copyrights holders.

Recently, consumer demand has been increasing for ways to allow end users of content to use, or share, the content in multiple devices, e.g., the television, a personal computer (PC), a laptop computer, a mobile telephone, etc. Content providers are interested in providing end users with this capability, but need to be able to ensure that the provided content is fully secured and that control over access and usage rights are controlled. Various DRM techniques have been proposed to address these goals.

One known DRM technique that is directed toward achieving these goals is implemented in iTunes products offered by Apple Computers, Inc. The DRM technique implemented in these products allows a user to share the same downloaded content among a fixed number of devices. The devices that share the content are managed by a master device, such as a PC, that checks the devices in and out to ensure that no more than an allowed number of devices are sharing the content at a given time. This DRM technique, however, is implemented in software, which is prone to subversion. In fact, this particular DRM technique has already been compromised by someone who was able to convert protected content into unprotected content.

DRM techniques have also been implemented in hardware. DRM hardware solutions generally are more secure or less easily compromised than DRM software solutions. Nevertheless, to date, no suitable hardware implementations have been developed that achieve the goals of allowing users to simultaneously share the same content among multiple devices while ensuring that the content remains secure, i.e., cannot be accessed by unauthorized or unintended users.

Accordingly, a need exists for a secure way of allowing content to be shared among multiple devices.

SUMMARY OF THE INVENTION

The invention provides an apparatus and a method for enabling content files to be shared among multiple user devices. In accordance with one aspect of the invention, the apparatus comprises a Master device that has an input/output (I/O) device configured to receive and send data, and a digital rights management (DRM) processor configured to perform a DRM algorithm. The DRM processor identifies at least one Slave device associated with the Master device and sends rights data associated with a content file to the Slave device identified as being associated with the Master device. The rights data enables a user device in which the Slave device is installed to gain access to the content file associated with the rights data.

In accordance with another aspect of the invention, the apparatus comprises a Slave device that has an IO device configured to receive and send data, and a DRM processor configured to perform a DRM algorithm. The DRM processor receives rights data via the I/O device from a Master device associated with the Slave device. The DRM processor extracts a key from the rights data and provides the key to the user device, which uses the key to gain access to a content file associated with the rights data.

In accordance with another aspect of the invention, the method performed by the Master device comprises identifying one or more Slave devices that are associated with the Master device, and causing rights data associated with a content file to be sent to a Slave device identified by the Master device as being associated with the Master device. A user device in which the Slave device is installed uses the rights data to gain access to the content file associated with the rights data.

In accordance with one aspect of the invention, the method comprises receiving rights data in a Slave device from a Master device associated with the Slave device, and extracting a key from the rights data and providing it to one or more components of the user device to enable the user device to gain access to a content file associated with the rights data.

In accordance with another aspect of the invention, the apparatus comprises at least first and second System Identification Module (SIM) cards electrically interfaced with one another. Each of the SIM cards has one or more electrical contacts thereon that are in electrical contact with one or more electrical contacts on another of the SIM cards to enable each of the SIM cards to communicate with at least one other of the SIM cards. Each SIM card includes a DRM processor configured to perform a DRM algorithm.

These and other features and advantages of the invention will become apparent from the following description, drawings and claims.

DETAILED DESCRIPTION OF EXEMPLARY EMBODIMENTS

In accordance with the invention, a method and apparatus are provided that allow content to be shared among multiple devices in a secure manner that prevents or reduces the likelihood that unintended users will gain access to the content or remove the DRM content protection. Thus, the invention provides a DRM solution that allows an end user to share content among multiple devices in a secure environment in which access and usage rights associated with the content are controlled.

The method and apparatus of the invention preferably are implemented in the form of a DRM hardware solution, such as a System Identification Module (SIM) card, for example. As is known in the art, a SIM card has an integrated circuit (IC) on it that provides a secure platform due to the fact that it is very difficult if not impossible to determine the configuration of the IC through inspection. Thus, a SIM card is an example of a hardware device that is suitable for use with the invention. However, the invention is not limited to using SIM cards for this purpose. Other hardware devices may instead be used. The invention is being described with reference to SIM cards in order to demonstrate an example of one possible implementation of the invention.

In accordance with the invention, a plurality of SIM cards are associated with one another in a way that allows them to communicate content amongst themselves and/or to communicate access and usage rights amongst themselves. The associated SIM cards are distributed to an authorized user who then installs one of the cards in each of the user's devices that are to share content. One of the SIMs functions as the Master SIM and the other SIMs function as Slave SIMs. After the Master SIM has received content and access and usage rights from a content provider, the Master SIM provides the Slave SIMs with the content and with access and usage rights to that content. The Master SIM may transmit the content to the Slave SIMs, or the slave SIMs may download the content from the content provider site using rights that the Master SIM has provided to them.

Figure 1:
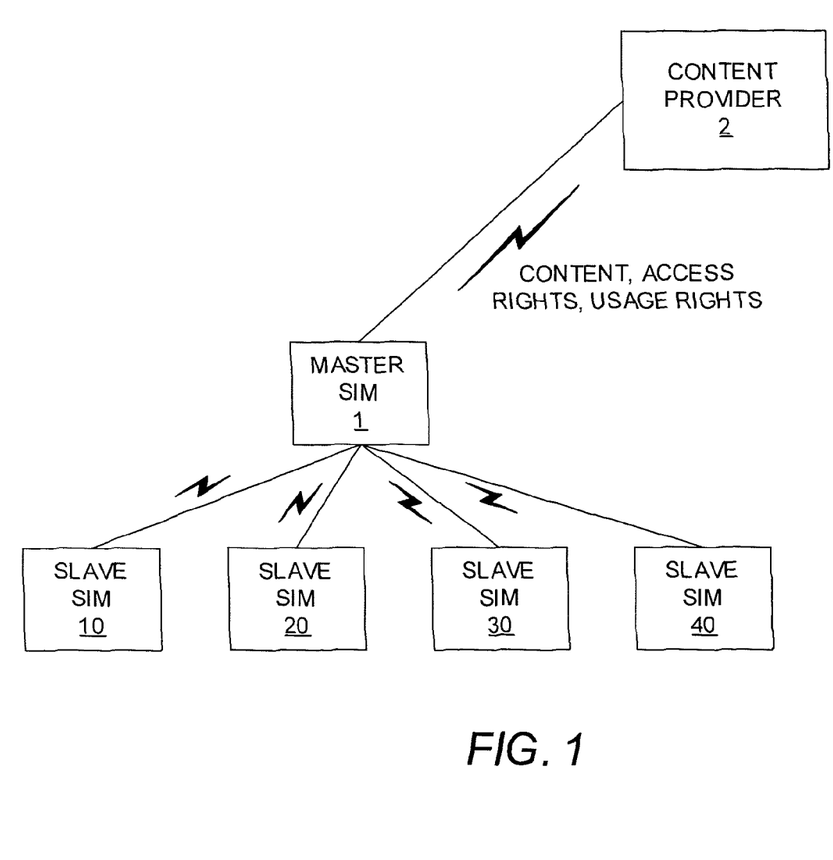
FIG. 1 illustrates a pictorial network diagram that demonstrates an example of the manner in which the invention allows multiple devices to share content.

FIG. 1 illustrates a pictorial network diagram that demonstrates an example of the manner in which the invention allows multiple devices to share content. In accordance with this exemplary embodiment, one Master SIM 1 is associated with four Slave SIMs 10, 20, 30 and 40. The Master SIM 1 is manufactured or one-time programmed with secret information about each of the Slave SIMs 10-40. Likewise, the Slave SIMs 10-40 are manufactured or one-time programmed with secret information about the associated Master SIM 1. The Slave SIMs 10-40 may be manufactured or one-time programmed with secret information about the each other.

A content provider 2 transmits content and access and usage rights associated with the content to the Master SIM 1. The content and rights may be transmitted wirelessly or over a wired link to the Master SIM 1. The manner in which content and the rights associated with the content are distributed is well known. For example, the way in which this is typically accomplished today is by sending the content file to the user device as an encrypted file. Subsequent to sending the encrypted content file to the user device, a decryption key is sent to the user device. The user device then uses the key to decrypt the content file to enable the content to be rendered on the user device.

The Master SIM 1 performs operations similar to those performed by the content provider 2 in that the Master SIM 1 transmits encrypted content files, access rights and usage rights to the associated Slave SIMs 10-40 over wired or wireless links. The access rights and usage rights are typically contained in digital keys. The term "rights data" is used herein to denote any type of data that is needed to be able to access and use content, including digital keys. The Master SIM 1 may transmit only rights data to the Slave SIMs 10-40 rather than transmitting rights data and content to the Slave SIMs 10-40. In this case, the Slave SIMs 10-40 will communicate directly with the content provider 2, which will then transmit the encrypted content associated with the access and usage rights to the Slave SIMs 10-40.

Figure 2:
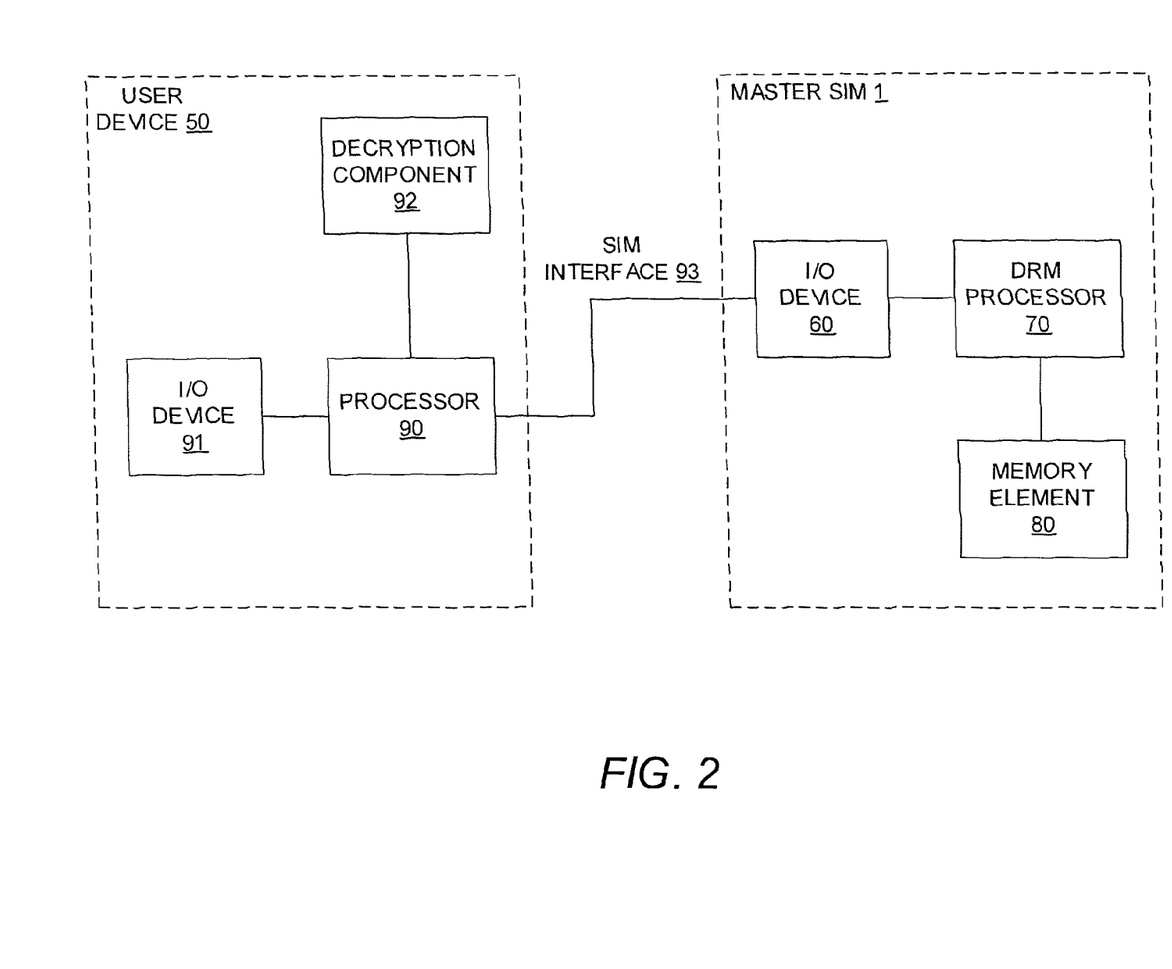
FIG. 2 illustrates a block diagram of the portion of the Master SIM shown in FIG. 1, and portions of a user device in which the Master SIM is installed.

FIG. 2 illustrates a block diagram of the portion of the Master SIM 1 that performs the DRM tasks of the invention, and portions of a user device 50 in which the Master SIM 1 is located. In this example, the user device 50 is a set-top box (STB) located at a subscriber premises, although the user device 50 may be any one of a variety of devices including, for example, a PC, a mobile telephone, a personal digital assistant (PDA), etc. The Master SIM 1 includes an input/output (I/O) device 60, a DRM processor 70 and a memory element 80. The STB 50 includes an I/O device 91, a processor 90 and a decryption component 92. Encrypted content files and keys are transmitted to the STB 50 from the content provider 2. The transmission of the encrypted content files and keys may be performed in the known manner described above with reference to FIG. 1. The invention is not limited with respect to the manner in which the content files and keys are delivered to the STB 50.

The encrypted content files and keys are received by the IO device 91 of the STB 50 and delivered to the processor 90 of the STB 50. The processor 90 sends the keys over a SIM interface 93 to the IO device 60 of the Master SIM 1, which delivers the keys to the DRM processor 70 of the Master SIM 1. The DRM processor 70 stores the keys in the memory element 80. When the STB 50 executes a rendering application program to render the content, the processor 90 of the STB 50 obtains the associated key from the Master SIM 1 via the SIM interface 93 and delivers the key to the decryption component 92, which then uses the key to decrypt the content file to allow the rendering application program to render the content on a rendering device (not shown), such as a television (not shown).

The DRM processor 90 performs one or more algorithms directed to authorizing the access and usage of content files received by the Master SIM 1 by one or more associated Slave SIMs 10-40. As stated above, the Master SIM 1 is manufactured or one-time programmed with information regarding the associated Slave SIMs 10-40, as well as with information regarding the access and usage rights that are to be provided by the Master SIM 1 to the Slave SIMs 10-40. The Slave SIMs 10-40 may or may not be provided with the same access and usage rights as are provided by the content provider 2 to the Master SIM 1. For example, the Master SIM 1 may be programmed or configured to execute rights rules that dictate the access and/or usage rights that are to be provided to the Slave SIMs 10-40.

The Master SIM 1 transmits the encrypted content files and data regarding the access and usage rights being provided to the Slave SIMs 10-40. This rights data includes the keys needed to decrypt the associated content files. The transmission of the encrypted content files and rights data to the Slave SIMs 10-40 may be over a wired or wireless link. Typically, the transmission of the encrypted content files and rights data to the Slave SIMs 10-40 will be via a wired interface. For example, if the Slave SIM 10 is used in a mobile telephone, the telephone user removes the card containing the Slave SIM 10 from the telephone and inserts it into a SIM card slot in the STB 50. The encrypted content and rights data are then transferred from Master SIM 1 to the Slave SIM 10.

Figure 3:
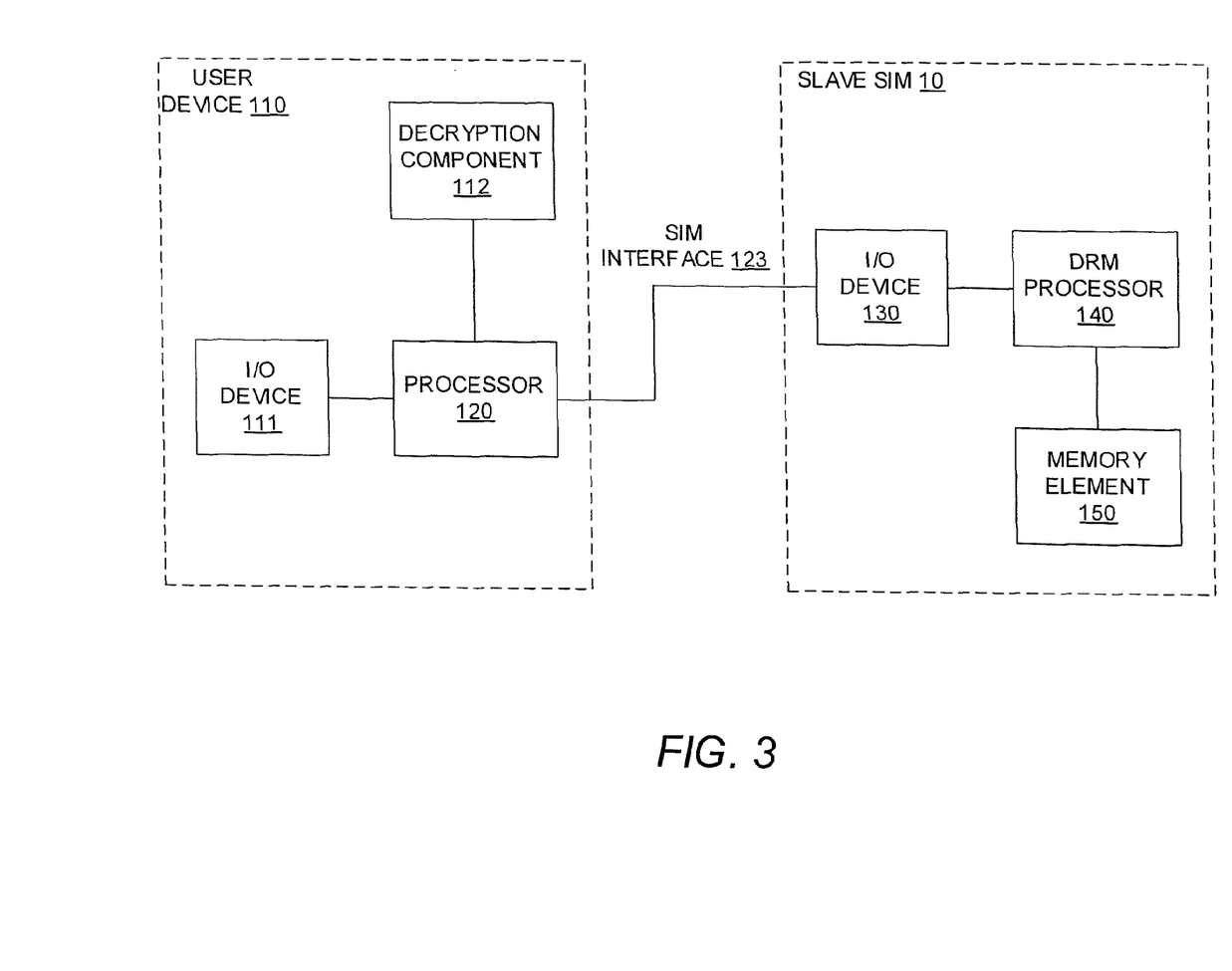
FIG. 3 illustrates a block diagram of the portion of one of the Slave SIMs shown in FIG. 1, and portions of a user device in which the Slave SIM is installed.

FIG. 3 illustrates a block diagram of the portion of one of the Slave SIMs 10 that performs the DRM tasks of the invention, and portions of a user device 110 in which the Slave SIM 10 is located. The Slave SIM 10 includes an I/O device 130, a DRM processor 140 and a memory element 150. The user device 110 in which the Slave SIM 10 is installed includes an I/O device 111, a processor 120 and a decryption component 112. Encrypted content files and rights data (e.g., keys) are transmitted to the user device 110 from the Master SIM 1. The encrypted content files and rights data are received by the I/O device 111 and delivered to the processor 120. The processor 120 sends the rights data over a SIM interface 123 to the I/O device 130 of the Slave SIM 10, which delivers the data to the DRM processor 140 of the Slave SIM 10. The DRM processor 140 stores the rights data in the memory element 150.

When the user device 110 executes a rendering application program to render the content, the processor 120 of the user device 110 obtains the associated key from the Slave SIM 10 via the SIM interface 123 and delivers the key to the decryption component 112, which then uses the key to decrypt the content file to allow the rendering application program to render the content on a rendering device (not shown), such as a television (not shown).

The DRM processor 140 of the Slave SIM 10 is manufactured or one-time programmed with information regarding the associated Master SIM 1. This information may also include information about the other Slave SIMs 20-40 associated with the Master SIM 1. In addition, the DRM processor 140 may be programmed or manufactured to execute a time-out routine that causes the DRM processor 140 to become disabled after a preset time period such that the content received from the Master SIM 1 cannot be used by the user device 110 after the expiration of the preset time period. This can be accomplished in a variety of ways. For example, the Slave SIM 10 may include an on-board clock that the DRM processor 140 uses to determine when the time-out time period has expired. In this case, the DRM processor 140 counts clock cycles and determines when the number of clock cycles counted exceeds a threshold value. Rather than the Slave SIM 10 executing the time-out routine, the Master SIM 1 may execute an algorithm that causes a disabling signal to be transmitted to the Slave SIM 10 after the expiration of a preset time period.

Regardless of how the DRM processor 140 of the Slave SIM 10 is disabled from using the content after a preset time period, once the DRM processor 140 has become disabled, the Slave SIM 10 will need to be "refreshed" in order for the DRM processor 140 to again become enabled. The Slave SIM 10 may be refreshed in a number of ways. For example, the Slave SIM 10 may be refreshed by inserting the card on which the Slave SIM 10 is located into a slot (not shown) in the user device 50 in which the Master SIM 1 is installed. The Master SIM 1 then transfers access and/or usage rights data to the Slave SIM 10. Another way of refreshing the Slave SIM 10 is to place very tight time constraints on the refreshing process such that if the refreshing process is not performed within a relatively short preset time period, the refresh process fails. For example, if the refresh process is performed by directly connecting a Universal Serial Bus (USB) port of the Master SIM 1 to a USB port of the Slave SIM 1, and communicating the enabling signals between the ports, the refreshing process will be accomplished very quickly due to the high rate of data transfer provided by the USB communications protocol. Consequently, the refreshing process will be successful. On the other hand, if an attempt is made to perform the refreshing process over an Internet link, the round trip delay incurred in communicating data between the Master SIM 1 and the Slave SIM 10 will be too great to allow the refreshing process to be successfully completed within the corresponding time constraints. The time-out/refresh feature of the invention is useful in that it prevents a thief or otherwise unauthorized user of the Slave SIM 10 from being able to use content supplied by the Master SIM 1.

Figure 4:
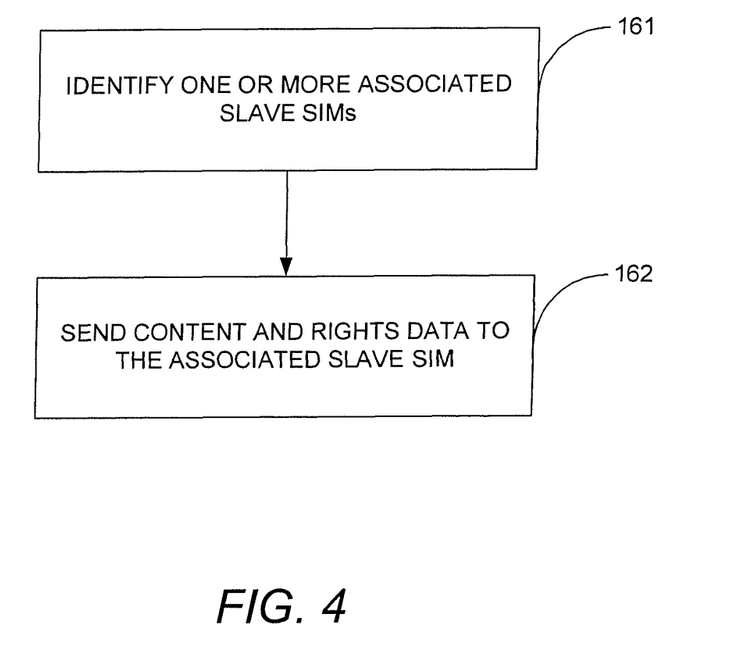
FIG. 4 illustrates a flowchart that represents the method of the invention performed by the Master SIM shown in FIG. 2 in accordance with an exemplary embodiment.

FIG. 4 illustrates a flowchart that represents the method of the invention performed by the Master SIM in accordance with an exemplary embodiment. After the Master SIM receives content and rights data from a content provider, the Master SIM performs a DRM algorithm to identify one or more associated Slave SIMs, as indicated by block 161. The Master SIM may execute the DRM algorithm automatically to identify an associated Slave SIMs. For example, the Master SIM may execute the DRM algorithm and identify any associated Slave SIMs when the Master SIM is first installed in the user device and supplied power. Alternatively, the Master SIM may execute the DRM algorithm only upon receiving a protected content file from the content provider. Alternatively, the Master SIM may only execute the DRM algorithm when a Slave SIM requests a content file from the Master SIM. After the Master SIM has identified one or more associated Slave SIMs, the Master SIM sends content and rights data to the Slave SIMs, as indicated by block 162.

Figure 5:
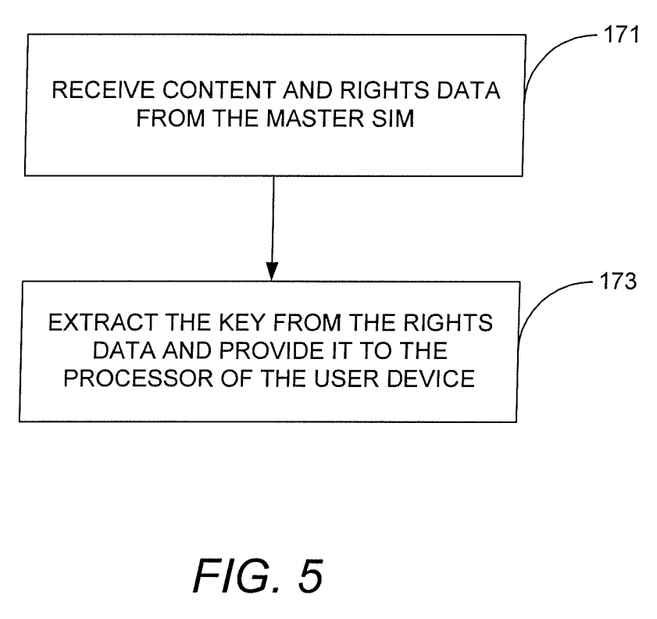
FIG. 5 illustrates a flowchart that represents the method of the invention performed by the Slave SIM shown in FIG. 3 in accordance with an exemplary embodiment.

FIG. 5 illustrates a flowchart that represents the method of the invention performed by the Slave SIM in accordance with an exemplary embodiment. The Slave SIM receives a content file and rights data from a Master SIM, as indicated by block 171. The Slave SIM typically stores the rights data (e.g., decryption keys) in memory in the Slave SIM. The Slave SIM extracts the key from the rights data and provides it to the processor of the user device, as indicated by block 173. As described above, a decryption component of the user device uses the keys to decrypt the content.

Figure 6:
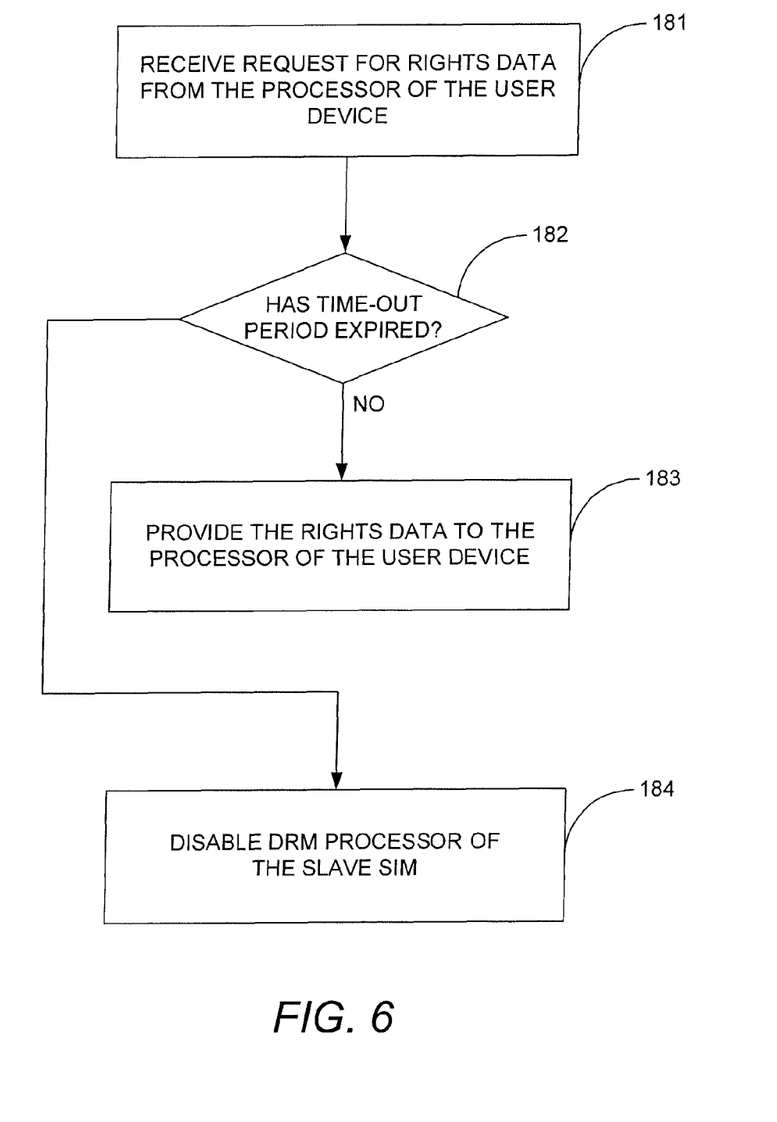
FIG. 6 illustrates a flowchart that represents another exemplary embodiment of the method performed by the Slave SIM shown in FIG. 3.

FIG. 6 illustrates a flowchart that represents another exemplary embodiment of the method performed by the Slave SIM. In accordance with this embodiment, the DRM algorithm performed by the Slave SIM includes the time-out routine described above with reference to FIG. 3. Whenever the processor 120 of the user device 110 executes an application program to render the content, the processor 120 sends a request for the content key over the SIM interface 123 to the Slave SIM 10. The DRM processor 140 receives the request, as indicated by block 181. The DRM processor 140 then determines whether the time-out period has expired, as indicated by block 182. If the DRM processor 140 determines that the time-out period has not expired, the DRM processor 140 sends the key to the processor 120 of the user device, as indicated by block 183. If the DRM processor 140 determines that the time-out period has expired, the DRM processor 140 disables itself, as indicated by block 184. Instead of disabling itself, the DRM processor 140 may simply not send the key to the processor 120 of the user device. The DRM processor 140 may send a message to the processor 120 to inform the user that the Slave SIM 10 has become disabled and needs to be refreshed by the Master SIM 1. The DRM processor 140 may also send a message to the processor 120 when the time-out period is close to expiring so that the user can refresh the Slave SIM 10 before it becomes disabled to avoid interruption of content rendering.

The DRM processors 70 and 140 used in the Master and Slave SIMs 1 and 10 may be any type of computational devices that are suitable for performing the functions described above with reference to FIGS. 1-6, including, for example, a microprocessor, a microcontroller, an application specific integrated circuit (ASIC), a programmable gate array, etc. The processor may be implemented solely in hardware or in a combination of hardware and software or firmware. In the case where the processors are implemented in a combination of hardware and software or firmware, the software programs executed by the processor will be stored in the memory elements 80 and 150. The memory elements 80 and 150 are typically solid-state devices integrated with the DRM processors 70 and 140, respectively, on the same IC. The memory elements 80 and 150 may be any type of computer-readable mediums such as, for example, random access memory (RAM), dynamic RAM (DRAM), flash memory, read only memory (ROM), compact disk ROM (CD-ROM), digital video disks (DVDs), magnetic disks, magnetic tapes, etc. The invention also encompasses electrical signals modulated on wired and wireless carriers (e.g., electrical conductors, wireless carrier waves, etc.) in packets and in non-packet formats.

Figure 7:
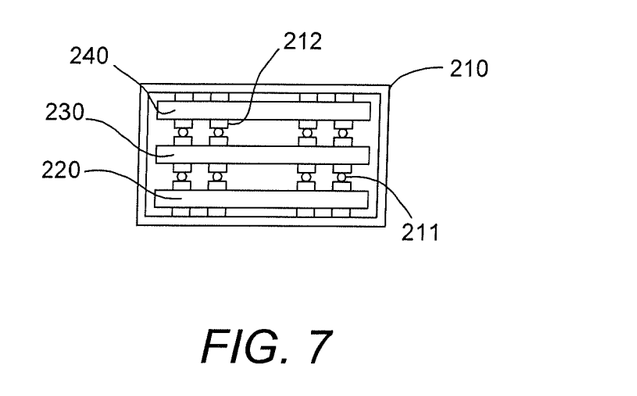
FIG. 7 illustrates a pictorial diagram of a cavity formed in a user device and configured to accommodate multiple SIMs to allow content and access and usage rights to be shared among the SIMs.

In order to provide a user with the ability to share content with multiple other users, the user device may have multiple SIM card slots in it for installing Master and/or Slave SIM cards in the user device. Alternatively, the user device may have a cavity in it configured to hold multiple SIM cards. The SIM cards have modified physical and electrical designs that allow them to interface with each other and function as a single system. FIG. 7 illustrates a pictorial diagram of a cavity 210 formed in a user device (not shown) and configured to accommodate multiple SIM cards 220, 230 and 240. The SIM cards 220, 230 and 240 are stacked one on top of another (or side by side) and electrically connected to one another to allow them to communicate with each other. The electrical connections between the SIM cards 220, 230 and 240 may be made by metal bumps 211 that are formed on at least some of the contacts 212 of the SIM cards 220, 230 and 240. The cavity 210 may be, for example, a spring-loaded holder of the user device for enabling the SIM cards to be easily loaded into and unloaded from the user device.

The invention has been described with reference to certain embodiments for the purpose of demonstrating the principles and concepts of the invention. It should be noted, however, that the invention is not limited to the embodiments described herein. As will be understood by those skilled in the art, many modifications can be made to the embodiments described herein, and all such modifications are within the scope of the invention.

What is claimed is:

1. A system comprising:
   a user device having a processor and a memory;
   a master System Identity Module (SIM) card;
   a slave SIM card associated with a user device;
   a holder configured to be loaded and unloaded with a plurality of SIM cards, wherein the plurality of SIM cards includes the master SIM card and the slave SIM card, and wherein the master SIM card and the slave SIM card are electrically connected; and
   the memory of the user device including computer program instructions that, when executed by the processor of the user device, cause the processor to perform the operations of:
   receiving and sending data, by the slave SIM card via an input/output (I/O) device;
   receiving, by a digital rights management (DRM) processor of the slave SIM card, rights data via the I/O device from the master SIM card;
   extracting, by the digital rights management (DRM) processor of the slave SIM card, from the rights data a key that is usable by the user device to gain access to a content file associated with the rights data;
   determining by the digital rights management (DRM) processor of the slave SIM card, whether a time-out period is close to expiring; and
   based on the determination that the time-out period is close to expiring:
   informing, by the DRM processor of the slave SIM card to the processor of the user device, that the time-out period is close to expiring and the slave SIM card should be refreshed by the master SIM card;
   disabling, by the DRM processor of the slave SIM card, itself;
   refreshing, by the master SIM card, the slave SIM card, wherein refreshing the slave SIM card comprises:
   receiving, at the slave SIM card from the master SIM card, refresh rights data associated with the content file; and
   re-enabling, by the master SIM card, the DRM processor of the slave SIM card responsive to receiving the refresh rights data associated with the content file.

2. The system of claim 1, wherein the DRM processor also receives the rights data and the content file associated with the rights data from the master SIM card.

3. The system of claim 1, wherein the rights data includes access and usage rights data.

4. The system of claim 1, wherein the processor of the user device further perform the operation of: storing the rights data received in the slave SIM card from the master SIM card in a memory element.

5. A method, comprising:
   receiving and sending data, by a slave System Identity Module (SIM) card via an input/output (I/O) device;

receiving, by a digital rights management (DRM) processor of the slave SIM card via the I/O device from a master SIM card;
   extracting, by the DRM processor of the slave SIM card, from the rights data a key that is usable by a user device to gain access to a content file associated with the rights data;
   determining, by the DRM processor of the slave SIM card whether a time-out period is close to expiring; and
   based on the determination that the time-out period is close to expiring:
      informing, by the DRM processor of the slave SIM card to a processor of the user device, that the time-out period is close to expiring and that the slave SIM card should be refreshed by the master SIM card;
      disabling, by the DRM processor of the slave SIM card, itself;
      refreshing, by the master SIM card, the slave SIM card, wherein refreshing the slave SIM card comprises:
         receiving, at the slave SIM card from the master SIM card refresh rights data associated with the content file; and
         re-enabling, by the master SIM card, the DRM processor of the slave SIM card responsive to receiving the refresh rights data associated with the content file.

6. The method of claim 5, wherein the rights data includes access and usage rights data.

7. The method of claim 5, wherein the rights data is stored in a memory element of the master SIM card.

8. The method of claim 5, wherein the rights data includes a digital decrypting key that is usable by a second user device in communication with the slave SIM card to decrypt the content file.

* * * * *